Figure 1:
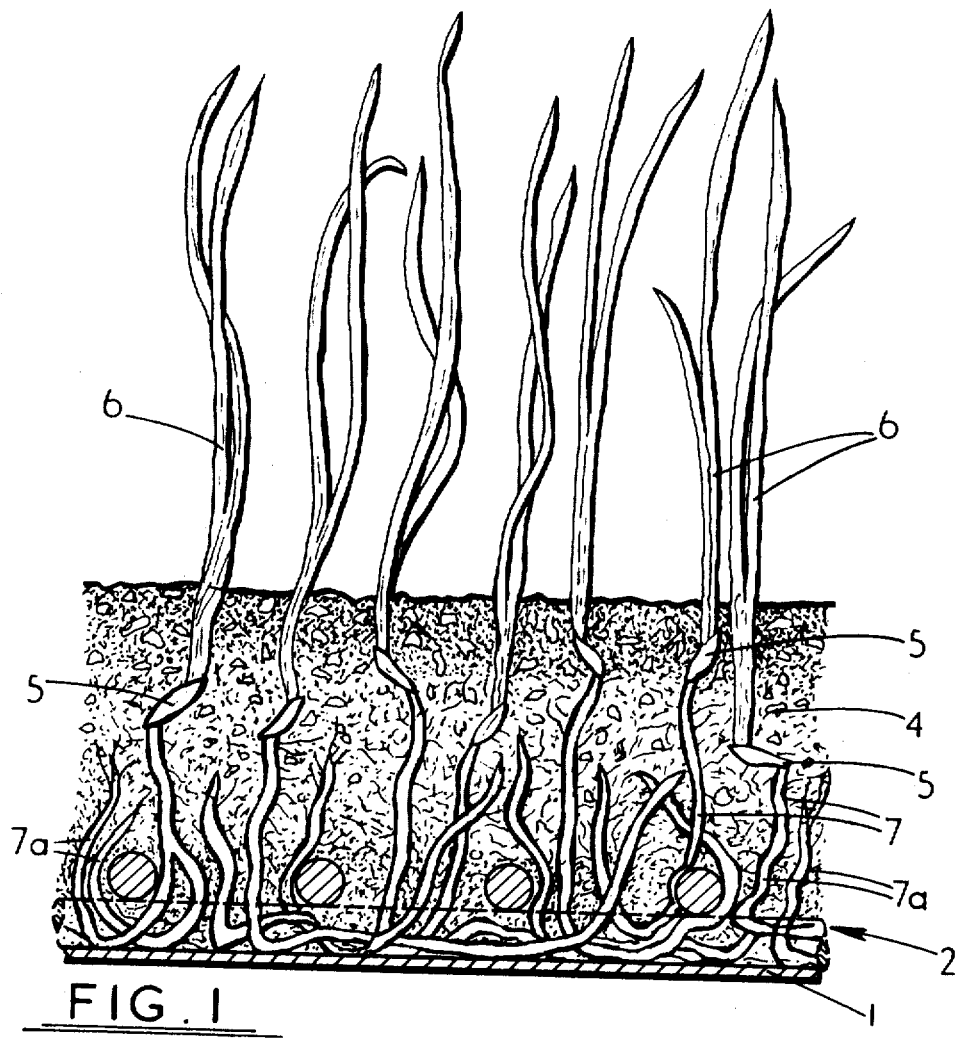

United States Patent [19]
Loads

[11] 3,863,388
[45] Feb. 4, 1975

[54] GROWING OF GRASSES

[75] Inventor: Frederick Walter Loads, Brookhouse, near Lancaster, England

[73] Assignee: F. B. Mercer, Limited, Lancashire, England

[22] Filed: Sept. 14, 1973

[21] Appl. No.: 397,279

Related U.S. Application Data

[63] Continuation of Ser. No. 179,140, Sept. 9, 1971, abandoned.

[30] Foreign Application Priority Data
Sept. 10, 1970 Great Britain ............... 43457/70

[52] U.S. Cl. .................................. 47/56
[51] Int. Cl. ............................. A01g 1/00
[58] Field of Search ........................ 47/56

[56] References Cited
UNITED STATES PATENTS
2,605,589  8/1952  Kuestner ............................ 47/56
2,923,093  2/1960  Allen ................................. 47/56

FOREIGN PATENTS OR APPLICATIONS
1,126,663  3/1962  Germany

Primary Examiner—Robert E. Bagwill
Attorney, Agent, or Firm—Stevens, Davis, Miller & Mosher

[57] ABSTRACT

A method of growing grass in which grass seeds are mixed with a rooting medium and distributed over a reticulate structure such as plastics mesh. An impermeable layer in the reticulate structure prevents the grass roots from extending downwardly and thereby causes the roots to bind the structure together to form a thin grass bearing lamina.

5 Claims, 6 Drawing Figures

PATENTED FEB 4 1975 3,863,388

SHEET 1 OF 3

GROWING OF GRASSES

This is a continuation, division, of application Ser. No. 179,140, filed Sept. 9, 1971 now abandoned.

This invention relates to a pre-fabricated lamina of growing grass, or other soil binding plants (hereinafter referred to, for brevity, as grass or grasses) adapted to be transportable and layable in final situ on a prepared earth surface whereafter the grass grows down into the earth so that the lamina becomes one with the earth. The grass-bearing lamina, according to the present invention, in which a layer of rooting medium (as hereinafter defined) is incorporated, is analogous to a conventional (natural) grass turf but with, inter alia, the following substantial differences:

a. under correct conditions of light, heat and moisture the grass seed germinates in about 4 to 5 days after sowing in the rooting medium and a lamina bearing a crop of grass blades with well developed root systems can be obtained in about 14 days.

b. the lamina of growing grass and rooting medium is fully coherent and transportable after about 14 days and may be flexed, rolled up and un-rolled with minimal loss of rooting medium and little or no loss of grass or break-up of the lamina.

c. the thickness of the lamina need not be more than a quarter of an inch, so that the weight of the lamina per square foot is very light and its bulk is a fraction of that of a conventional or natural turf. It can also be cut or trimmed easily with shears or household scissors.

d. the lamina is very flexible compared with a conventional (natural) turf and when laid can easily follow contours and slopes.

e. the lamina is tensilely reinforced right up to its edges so reducing the liability to damage at the edges of paths or beds.

f. the lamina does not need to be cut from the ground as is the case with natural turf, but when laid and rooted can be lifted conventionally and relaid but in larger areas than natural turf.

g. the dimensions (area) of the lamina can be of any size compatible with ease of handling either in the production or laying stages.

h. the lamina can be seeded with any desired strain of grass or mixtures thereof.

i. since the production of the lamina is preferably and conveniently "in-doors", at least in the initial stages, the seed at the sowing stage is not subject to the depredation of birds and can take place throughout the whole year.

j. the lamina is wholly or substantially weed-free.

k. where a totally non-organic rooting medium is used (e.g. exfoliated mineral), the lamina is free of fungus (botrytis) contamination from the beginning.

l. laminae can be pegged out with minimal labour on a sea shore and washed by the sea to produce sea-washed turf.

By contrast conventional (natural) turf takes upwards of five years in climates like that of the United Kingdom to establish a root system of sufficient development and strength to bind the earth into a degree of coherence enabling the turf to be cut free and transported. At the same time a conventional (natural) turf is far less flexible and far more liable to cracking or breakage than the lamina according to the present invention. The bulk and weight of a conventional (natural) turf can be in the order of six times and above that of the lamina according to the present invention, area for area.

The seeding of grass in the open and in situ can normally take place in climates like that of the United Kingdom only in Autumn or Spring. While the germination of the seed in Autumn is more rapid than in the Spring, at both times of year germination is a matter of several weeks and a growth of grass is not established for several months and such growth is not ready for mowing for several months thereafter. With the lamina according to the present invention, the grass is fit for mowing about 2½ to 3 weeks after laying in situ.

As a result of the above advantages of the grass-bearing lamina, according to the present invention, areas can be grassed at lower capital, transportation and labour costs and order for specified grasses or grass mixtures (or other soil binding plants) can be executed in a matter of weeks. Also grass-bearing laminae, according to the present invention, can be stocked by horticultural shops for immediate sale and use or distributed by mail order, or stored under suitably chilled conditions.

The invention consists in a pre-fabricated grass-bearing lamina for the purpose of turfing land comprising growing grass plants rooted in a rooting medium, tersilely reinforced and stablished by an incorporated layer of flexible reticulate material bonded thereto by the interwoven root structure of the grass extending through the rooting medium and the meshes of the layer of reticulate material.

The invention further consists in a pre-fabricated grass-bearing lamina comprising a flexible reticulate structure having a suitable mesh size, a layer or rooting medium (as defined hereafter) covering the reticulate structure and a uniform distribution of growing grass plants extending over the lamina surface whose roots extend through the layer of rooting medium and through the meshes of the reticulate structure, thus by root entwinement binding the rooting medium and the reticulate structure into a coherent unit of laminar form presenting from one surface growing grass blades and at the other surface a root structure which can strike and grow into an earth surface on which the lamina is laid.

By "rooting medium" is meant any material capable of permitting the germination and root-growth of grass plants either with or without the addition of soil fertilizer, and may include inter alia soil or peat mixtures, exfoliated mineral preparations, or interconnecting open cell decomposable cellular resin foam materials.

The invention further consists in a method of producing a grass-bearing lamina as set forth above comprising placing a sheet of flexible reticulate structure of suitable mesh size over a surface impermeable to penetration by plant roots, distributing over the surface of the reticulate structure a layer of rooting medium either containing or in contact with an adequate quantity of grass seed of the selected variety or varieties (mixture), and subjecting the lamina to correct conditions of light, heat and moisture to effect rapid germination whereby the conducting roots (and the transient root hairs) from each seed grow through the layer of rooting medium lying above the reticulate structure, through the meshes in the reticulate structure, so that the root system so produced bonds the rooting medium and the reticulate structure into a coherent unit of flexible laminar structure having at one surface growing grass blades and at the other surface a root structure which will strike and grow into an earth surface on which the lamina is laid.

According to the above method, the reticulate structure may be placed directly on the impermeable surface or there may be provided a shallow intervening layer of loosely discrete material into which the roots can extend after passing through the reticulate structure, the nature and consistency of such an intervening layer material being such that it does not harmfully resist withdrawal of the roots therefrom when the lamina is lifted.

According to one mode of carrying out the invention as set out in the preceding paragraph, the reticulate structure is in substantially overall contact with the impermeable surface and the grass seed is admixed with or spread over the surface of the rooting medium, so that when germination takes place, the roots grow downwards from and through the layer of rooting medium lying above the reticulate structure, through the meshes of the reticulate structure into any fines of the rooting medium which have passed through the meshes of the reticulate structure into the space between the latter and the impermeable surface, the roots then being deflected laterally by the impermeable surface across the mesh openings of the reticulate material and then upwards again (in search of food) into the main layer of rooting medium.

Preferably the grass seed and the rooting medium is pre-mixed and "chitted," i.e., subjected to conditions of darkness and moisture so that a high proportion of the seeds germinate or are on the verge of germination before the mixture is spread over the reticulate structure.

According to an alternative mode of carrying out the invention as set out in the preceding paragraph but one, the grass seed is distributed directly onto the impermeable surface, and then covered by the reticulate structure on top of which the layer of rooting medium is spread, so that while the grass blade grow up through the layer of rooting medium into the air, the roots grow laterally over the impermeable surface and then up through the meshes of the reticulate structure into the layer of rooting medium.

In order to accelerate germination, the layer of seeded rooting medium may be covered by opaque sheet material such as paper, polyethylene or polyvinyl chloride. During the production of a grass-bearing lamina according to the present invention and as set forth in the preceding paragraph, the growing grass may be fed as required by the application of soil fertilizer. Also, if required, the grass may be mown when sufficiently matured, in which case when folial feeding is used, mowing should not take place for at least 24 hours after the folial fertilizer has been applied.

The impermeable surface underlying the reticulated structure may be formed of any material impermeable to root penetration, e.g., concrete, hardboard, metal, but preferably comprises a flexible sheet material such as polyethylene or polyvinylchloride sheet (film) or heavy (e.g. kraft) paper surface-treated with, for example, polyvinyl-acetate. Such a flexible impermeable surface material may be used not only during the initial growing period (as described) but may be used as a carrier for the laminae or to interleave stacked layers of laminae or the coils of a rolled-up lamina during storage (if necessary under suitably chilled conditions) and, during subsequent laying in situ, when after the lamina has been correctly positioned, the impermeable sheet material can be drawn out from underneath.

The flexible reticulate material may be any net-like structure of a material which will not rot or decompose at least over a period of months. In certain instances it is preferable to use a material which will not rot, e.g., a plastic; material such as polyethylene; whereas in other instances a decomposable material, e.g., a biodegradable, can be favourable. The net-like structure may be made up of strands knitted, woven or welded together, but it is preferred to employ an integral extruded net more particularly one in which the crossing sets of strands lie in two parallel planes, so that, when the net comprising the reticulate material is laid on the impermeable surface, the uppermost strands are spaced from the impermeable surface by the thickness of the lowermost strands thereby providing a shallow space to be filled with the fines from the rooting medium through which the deflected grass roots can grow laterally as already described.

Alternatively, since the ideal reticulate structure is one in which the strands are as fine, or contain as little resin as possible compatible with the tensile strength required, while presenting to the rooting medium a sufficiently close mesh structure to permit adequate bonding of the rooting medium by the grass roots, a composite reticulate structure may be used. For example, a lightweight integrally extruded square-mesh net of adequate tensile strength having a mesh size of, say, one quarter of an inch has bonded or laminated thereto a network structure of close mesh but low tensile strength, such as "Net 909" produced by Smith & Nephew Limited, which is a network formed by passing an extruded plastics film through embossing rollers to form a reseau of relatively thick portions enclosing areas which are relatively thin and thereafter bi-axially stretching the film to orientate the thicker portions and rupture the thinner areas to form the mesh openings.

A similar result can be obtained by applying and bonding to a square mesh reticulate structure of a mesh size of, say, a quarter of an inch, a plurality of closely spaced warp threads, yarns or mono filaments so that the meshes of the square mesh structure are filled in with close, parallel fine members.

The grass bearing laminae may be in the form of turves, say three feet by three feet or long lengths, say three feet wide and of a length dictated only by handling in the production and/or laying stages.

The application of the invention is as diverse as the use of situ-sown grass or conventional turving, e.g., lawns, golf courses, bowling greens, sports fields, airports, embankments or cuttings, or exhibition stands or grounds. In the case of sports field, golf greens or cricket pitches, the invention is of particular advantage by minimising or localising damage. Where the application of the invention is solely soil binding, e.g., turving embankments or cuttings, the laminae will contain or comprise soil binding plants other than grasses, e.g., clover or camomile.

Figure 2:
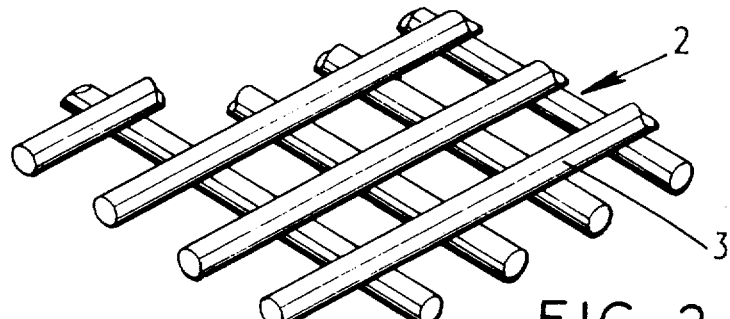
Figure 3:
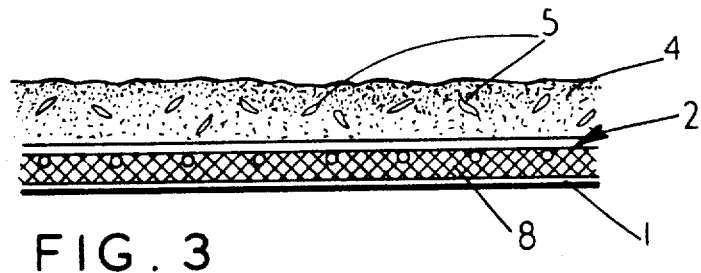

In the accompanying drawings:

FIG. 1 is a sectional side elevation on an enlarged scale of part of a grass-bearing lamina according to the present invention, FIG. 2 is a perspective view of one form of reticulate structure as used in the present invention and shown in FIG. 1, FIG. 3 is a sectional side elevation on a smaller scale of another composition of grass-bearing lamina according to the present invention shown prior to seed germination.

Figure 5:
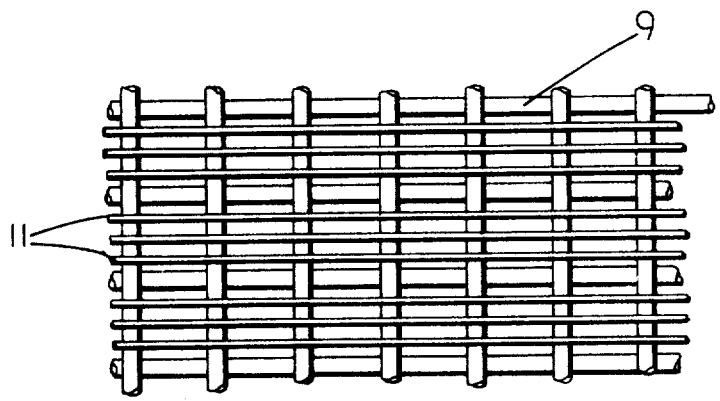
Figure 4:
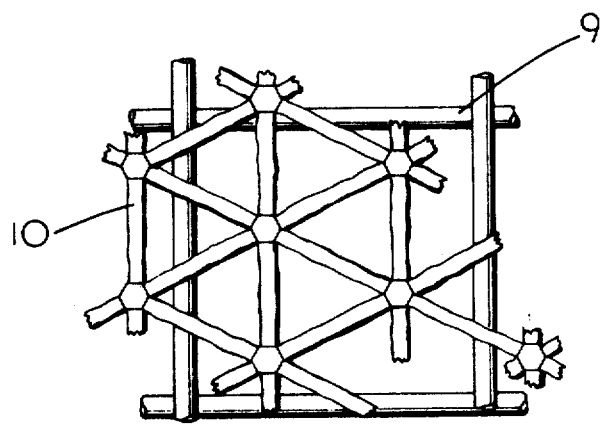
Figure 6:
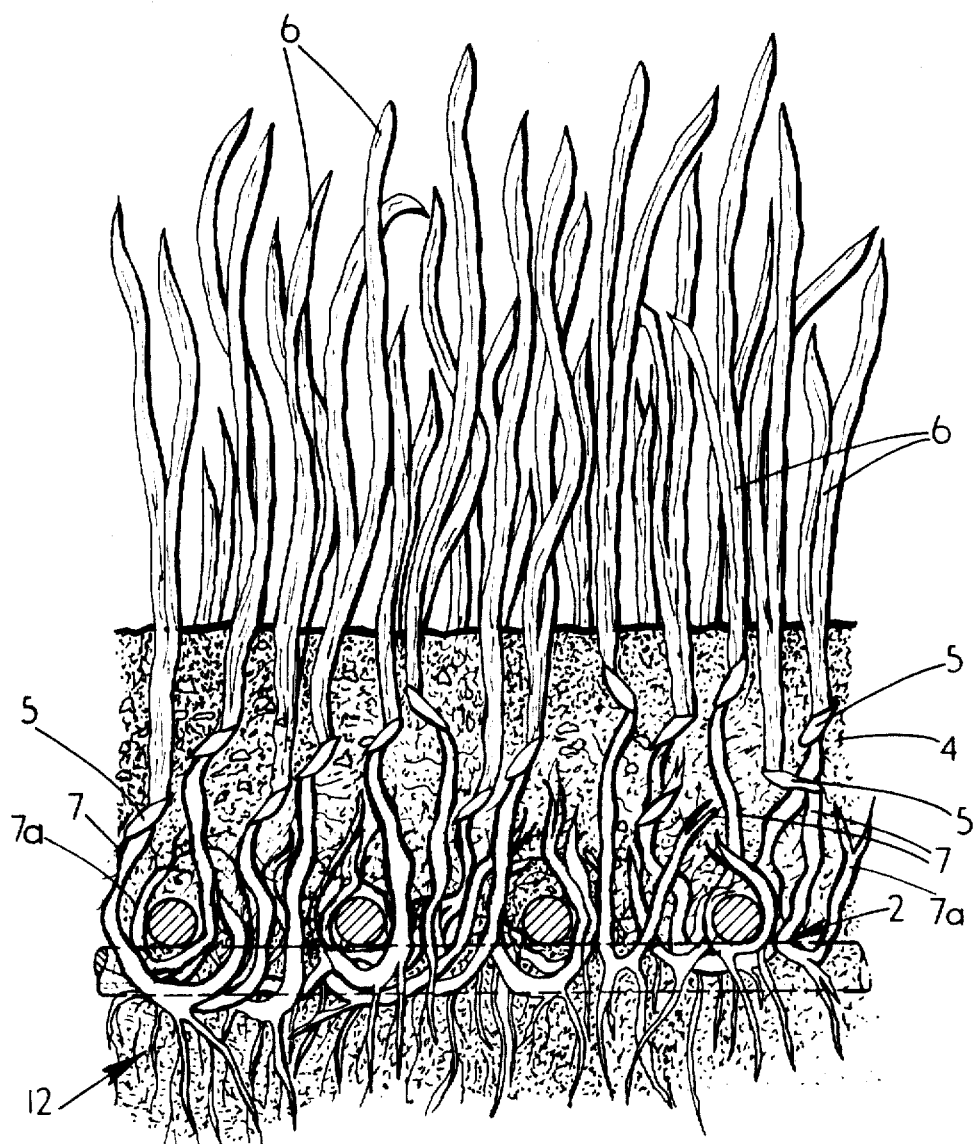

FIG. 4 is a plan view on an enlarged scale, of an alternative form of reticulate structure in laminated form for use in the present invention, FIG. 5 is a plan view on an enlarged scale of a further alternative form of reticulate structure for use in the present invention, and FIG. 6 is a sectional side elevation on an enlarged scale of part of a grass-bearing lamina according to the present invention laid on a prepared earth surface and showing the grass roots striking into the earth.

In carrying the invention into effect according to one mode by way of example, see FIGS. 1 and 2 a layer 1 of impermeable surface material is laid on any suitable foundation (not shown). On top of the layer 1 is placed a layer 2 of reticulate material 3, see also FIG. 2.

The layers 1 and 2 are covered to a depth of say one quarter to three-eighths of an inch with a layer 4 of rooting medium in which is dispersed a sufficiency of grass seeds 5, from which spring grass blades 6 and roots 7. The roots 7 move downwardly in the rooting medium 4, pass through the mesh openings in the reticulate layer 2 and encounter the impermeable surface layer 1 which deflects the roots laterally, as indicated. When the food in the zone between layers 1 and 2 is exhausted the roots move upwardly, see 7a back into the layer of rooting medium 4, thereby interweaving the layer 4 of rooting medium and the reticulate structure 3 into a coherent entity with themselves to produce the grass-growing lamina according to the present invention.

When adequately grown the lamina is ready to be separated from the impermeable surface layer 1 and laid on a prepared earth surface into which the roots 7 will strike.

In FIG. 1 the reticulate structure 3 is shown laid in direct contact with the impermeable layer 1, but in FIG. 3 there is shown an alternative arrangement in which the impermeable layer 1 and the reticulate structure layer 2 are separated by a shallow intervening layer 8 of a loosely discrete material which will offer no harmful resistance to the eventual withdrawal therefrom of any grass roots which have grown into the layer 8.

FIG. 4 shows a further alternative form of a reticulate structure comprising a square mesh net 9 of adequate tensile strength but with overlayer meshes and an infilling layer of weaker but finer gauge net 10 laminated thereto.

FIG. 5 shows a still further alternative form of reticulate structure comprising the same square mesh net 9, the meshes of which are in-filled by a plurality of closely spaced warp members 11 in the form of threads or monofilaments bonded to the net 9.

In FIG. 6, the grass-bearing lamina of FIG. 1 is shown in position on a prepared earth surface 12 with the roots 7 striking downwards into the earth. A thicker lamina may be produced by allowing the roots 7 to grow into the earth and then employing a conventional turf lifting machine to remove the thicker lamina, the blade of the machine being set to cut, say, ¼ inch below the layer 2 of reticulate material.

What we claim is:

1. A method of producing a grass bearing lamina comprising a sheet of flexible plastic reticulate structure composed of a first set of strands of single filaments positioned transversely to a second set of strands of single filaments to form a rectangular mesh of about ¼ inch directly in contact with a surface impermeable to penetration by plant roots, the form of the reticulate structure being such that when placed in direct contact with said surface, shallow spaces are present between said surface and at least one of said sets of strands, distributing over the surface of the reticulate structure a layer of rooting medium containing an adequate quantity of grass seed of the selected variety or varieties, and subjecting the lamina to correct conditions of light, heat and moisture to effect rapid germination whereby the conducting roots from each seed grow through the layer of rooting medium lying above the reticulate structure, through the meshes in the reticulate structure, so that the the root system so produced bonds the rooting medium and the reticulate structure into a coherent unit of flexible laminar structure having at one surface growing grass blades and at the other surface a root structure which will strike and grow into an earth surface on which the lamina is laid.

2. The method of claim 1, wherein the weight of the lamina is of the order of one sixth the weight of natural turf.

3. The method of claim 1, wherein the grass-bearing lamina is transportable and is subjected to correct conditions for about 14 days.

4. The method of claim 1, wherein said laminar structure is no more than a quarter of an inch thick.

5. A method of producing a grass-bearing lamina comprising placing a layer of rooting medium containing an adequate quantity of grass seed of the selected variety or varieties in contact with a surface impermeable to penetration by plant roots, embedding a sheet of flexible plastic reticulate structure composed of a first set of strands of single filaments positioned transversely to a second set of strands of single filaments to form a rectangular mesh of about ¼ inch and subjecting the lamina to correct conditions of light, heat and moisture to effect rapid germination whereby the conducting roots from each seed grow through the layer of rooting medium and the meshes in the reticulate structure so that the root system so produced bonds the rooting medium and the reticulate structure into a coherent unit of flexible laminar structure having at one surface growing grass blades and at the other surface a root structure which will strike and grow into an earth surface on which the lamina is laid.

* * * * *